US008863034B2

(12) United States Patent
Liesche et al.

(10) Patent No.: US 8,863,034 B2
(45) Date of Patent: Oct. 14, 2014

(54) 3D TAG CLOUDS FOR VISUALIZING FEDERATED CROSS-SYSTEM TAGS

(75) Inventors: Stefan Liesche, Boeblingen (DE); Andreas Nauerz, Boeblingen (DE); Thomas Stober, Boeblingen (DE); Martin Welsch, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 13/191,221

(22) Filed: Jul. 26, 2011

(65) Prior Publication Data

US 2012/0042284 A1 Feb. 16, 2012

(30) Foreign Application Priority Data

Aug. 11, 2010 (EP) .................................... 10172498

(51) Int. Cl.
*G06F 3/048* (2013.01)
*G06F 17/30* (2006.01)
(52) U.S. Cl.
CPC .... *G06F 17/30994* (2013.01); *G06F 17/30014* (2013.01)
USPC ........... 715/848; 715/734; 715/737; 715/738; 715/836; 715/849
(58) Field of Classification Search
CPC ..... G06F 3/048; G06F 3/04812; G06F 17/00; G06F 17/22; G06F 17/241; G06F 17/2247; G06F 17/2725; G06F 17/30014; G06F 17/30713; G06F 17/30719; G06F 17/30731; G06F 17/30734; G06F 17/30017; G06F 17/30064; G06F 17/30592; G06F 17/30861; G06F 17/30864; G06F 17/30867; G06F 17/30905; G06F 17/30994; H04L 12/5885; G06Q 10/00; G06Q 30/00
USPC .................. 715/734–739, 834, 848, 836, 849
See application file for complete search history.

(56) References Cited

U.S. PATENT DOCUMENTS 5,515,486 A * 5/1996 Amro et al. ................... 715/848
6,486,898 B1 * 11/2002 Martino et al. ............... 715/853
(Continued)

FOREIGN PATENT DOCUMENTS

CN 1288600 A 3/2001
EP 2136301 A1 12/2009

OTHER PUBLICATIONS

Spannagle, P., and Soward, S., "WordPress and Flash 10x Cookbook", Apr. 2010, Packt Publishing, p. 158-159.*

(Continued)

*Primary Examiner* — Amy Ng
*Assistant Examiner* — Claudia Dragoescu
(74) *Attorney, Agent, or Firm* — Lee Law, PLLC; Christopher B. Lee

(57) ABSTRACT

A sphere is displayed on an interactive graphical user interface with a central circular disk that represents a current computer system, and a second circular disk that represents a second computer system as part of the sphere positioned parallel above or below the central circular disk. A current tag representing a first resource stored in a current storage of the current computer system is displayed on the interactive graphical user interface on a surface of the central circular disk. A second tag representing a second resource stored in a second storage of the second computer system is displayed on the interactive graphical user interface on a surface of the second circular disk.

22 Claims, 5 Drawing Sheets

(56) References Cited

U.S. PATENT DOCUMENTS

| | | | |
|---|---|---|---|
| 7,216,305 B1* | 5/2007 | Jaeger | 715/849 |
| 2002/0003548 A1* | 1/2002 | Krusche et al. | 345/736 |
| 2008/0072145 A1* | 3/2008 | Blanchard et al. | 715/273 |
| 2008/0092044 A1 | 4/2008 | Lewis et al. | |
| 2009/0094190 A1 | 4/2009 | Stephens | |
| 2009/0158146 A1 | 6/2009 | Curtis et al. | |
| 2009/0265631 A1* | 10/2009 | Sigurbjornsson et al. | 715/716 |
| 2009/0287989 A1* | 11/2009 | Chakra et al. | 715/205 |
| 2009/0327915 A1* | 12/2009 | Holdaway et al. | 715/745 |
| 2010/0030552 A1* | 2/2010 | Chen et al. | 704/9 |
| 2010/0229082 A1* | 9/2010 | Karmarkar et al. | 715/205 |
| 2011/0113386 A1* | 5/2011 | Sweeney et al. | 715/853 |

OTHER PUBLICATIONS

Green, J. A., "Drupal 6 Content Administration", Jun. 2009, Packt Publishing, Chapter 5 Section "Tag Clouds".*

"WordPress Tip: Rotating Flash Tag Clouds", Feb. 2009, Web page http://idratherbewriting.com/2009/02/19/rotating-flash-tagclouds-and-the-question-of-content-organization.*

Roy Tanck, WordPress plugin: WP—Cumulus Flash based tag cloud, Web Posting/blog: roytanck.com, Mar. 6, 2008, pp. 1-69, Published on the World Wide Web at: http://www.roytanck.com/2008/03/06/wordpress-plugin-wpcumulus-flash-based-tag-cloud/.

Sarah Perez, The Best Tools for Visualization, Web Posting: ReadWriteWeb, Mar. 13, 2008, pp. 1-9, Published on the World Wide Web at: http://www.readwriteweb.com/archives/the_best_tools_for_visualization.php.

Author Unknown, Visual Tag Cloud, Web Posting: CodePlex Open Source Community Website/page, Sep. 17, 2009, pp. 1-3, Published on the World Wide Web at: http://visualtagcloud.codeplex.com/.

Yusef Hassan-Montero, et al., Improving Tag-Clouds as Visual Information Retrieval Interfaces, Proceedings: I International Conference on Multidisciplinary Information Sciences and Technologies, Oct. 25-28, 2006, pp. 1-6, InSciT2006, Merida, Spain (also published on the World Wide Web at: http://www.nosolousabilidad.com/hassan/improving_tagclouds.pdf).

Author Unknown, Examiner, State Intellectual Property Office of the People's Republic of China, Office Action for CN Application No. 201110228958.2 (English translation not available), Nov. 26, 2013, pp. 1-12, P.R.China.

Author Unknown, Examiner, State Intellectual Property Office of the People's Republic of China, Office Action for CN Application No. 201110228958.2 (English translation not available), Aug. 4, 2014, pp. 1-14, P.R. China.

* cited by examiner

3D TAG CLOUDS FOR VISUALIZING FEDERATED CROSS-SYSTEM TAGS

RELATED APPLICATIONS

This application claims priority to and claims the benefit of European Patent Application Serial No. EP10172498.7 titled "3D TAG CLOUDS FOR VISUALIZING FEDERATED CROSS SYSTEM TAGS," which was filed in the European Patent Office on Aug. 11, 2010, and which is incorporated herein by reference in its entirety.

BACKGROUND

The present subject matter relates generally to interactive visualization of tags via an interactive graphical user interface as well as to a graphical interaction system. The present subject matter relates further to a computer system, a data processing program, and a computer program product.

Today, information or resources are often organized using web technologies. The resources are linked by hyperlinks, which are a mechanism by which to access the resources. Resources may be any kind of information available on the Internet—or on an intranet—in the form of text, pictures, videos, graphics or any other kind of a representation of information.

Often the resources are tagged, meaning that a tag is associated with a given resource. The tags may be user-generated or automatically generated. A group of tags may be named/referred to as a tag cloud. These tag clouds have become a popular mechanism for representing information or resources by assigning significance values, based on an access frequency, for tagging multiple, congregated/aggregated tags.

Document EP2136301A1 discloses a method of visualizing a tag cloud of individual tags, where each is a certain piece of information and is formed of one or more characters, and where tag meta information has been measured over a certain time interval so that there may exist a vector of meta information for said tag. The tags may be differentiated by font size, color saturation or inner spaces between slices of a tag. The slices may be composed of sliced tags. The sliced tags may also be positioned on a virtual stairway. A distinct height with respect to a baseline also represents certain meta information about a tag. The representation of a tag cloud is done in a two-dimensional way.

Document US 2009/0158146 A1 discloses a method and system for enabling a user to control or adjust importance levels, assigned to tags by manipulating corresponding tag representations or a tag group representation displayed to the user. In one embodiment, tag representations for a number of tags are displayed to a user. The tags are generally any criterion used to describe or classify digital content. In one embodiment, the user is enabled to resize, or otherwise manipulate, the tag representations to thereby adjust the importance level of the corresponding tags. In another embodiment, tags are classified into at least one tag group. A tag group representation corresponding to the tag group is displayed to the user. The user is then enabled to resize, or otherwise manipulate, the tag group representation to thereby adjust an importance level of each of the tags in the tag group.

BRIEF SUMMARY

A method of interactive visualization of tags via an interactive graphical user interface includes displaying on the interactive graphical user interface a sphere with a central circular disk that represents a current computer system, and a second circular disk that represents a second computer system as part of the sphere positioned parallel above or below the central circular disk; displaying a current tag representing a first resource stored in a current storage of the current computer system on the interactive graphical user interface, where the current tag is displayed on a surface of the central circular disk; and displaying a second tag representing a second resource stored in a second storage of the second computer system on the interactive graphical user interface, where the second tag is displayed on a surface of the second circular disk.

A system includes a displaying unit; and a processor programmed to cause the displaying unit to display on an interactive graphical user interface a sphere with a central circular disk that represents a current computer system comprising a current storage, and to display a second circular disk as part of the sphere representing a second computer system comprising a second storage, where the second circular disk is positioned parallel above or below the central circular disk; display a current tag representing a first resource stored in the current storage on the interactive graphical user interface, where the current tag is displayed on a surface of the central circular disk; and display a second tag, representing a second resource stored in the second storage on the interactive graphical user interface, where the second tag is displayed on a surface of the second circular disk.

A computer program product including a computer readable storage medium including computer readable program code, where the computer readable program code when executed on a computer causes the computer to display on an interactive graphical user interface a sphere with a central circular disk that represents a current computer system comprising a current storage, and to display a second circular disk as part of the sphere representing a second computer system comprising a second storage, where the second circular disk is positioned parallel above or below the central circular disk; display a current tag representing a first resource stored in the current storage on the interactive graphical user interface, where the current tag is displayed on a surface of the central circular disk; and display a second tag, representing a second resource stored in the second storage on the interactive graphical user interface, where the second tag is displayed on a surface of the second circular disk.

BRIEF DESCRIPTION OF THE SEVERAL VIEWS OF THE DRAWINGS

Preferred embodiments of the invention will now be described, by way of example only, and with reference to the following drawings.

DETAILED DESCRIPTION

Figure 1:
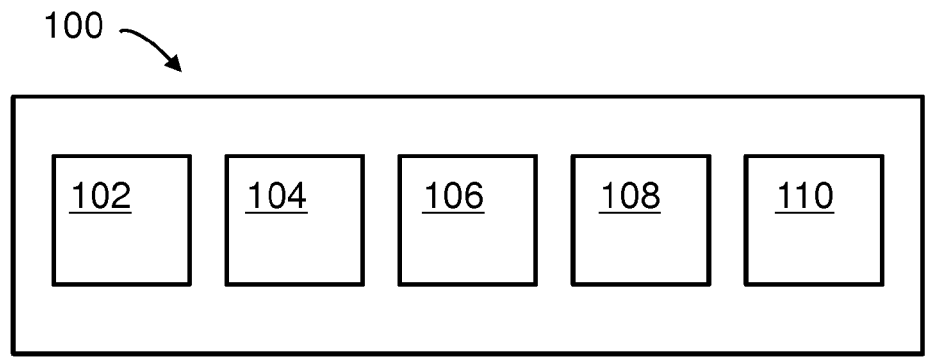
FIG. 1 shows a block diagram of the inventive method.

A tag cloud or word cloud, or weighted list in visual design, is a visual depiction of user-generated tags, or simply the word content of a site on the Internet or an intranet, typically used to describe the content of specific resources. Tags are usually single words or a small group of words and are normally listed alphabetically, and the importance of a tag may be shown with a font size or display color of a tag. Thus, it is possible to find a tag alphabetically and by popularity. The tags are usually hyperlinks that lead to a collection of items that are associated with a tag. There are a variety of ways to implement tag clouds. Some methods are more popular than others. Most clouds are primarily sorted alphabetically. Some sorting options are: (a) tags are sorted alphabetically, where the most important or frequent terms are highlighted via an appropriate font size; (b) tags may be sorted alphabetically, where all terms may have the same font size and weight, and more important terms may be highlighted with a font color or a background color; (c) tags may be sorted according to their importance or frequency, and both font size and colors may be used to emphasize the importance of terms; (d) tags may not be sorted at all and font size, font weight, and colors may be used; (e) tags may be sorted according to their similarity, where similar terms may appear as neighbors next to each other. As such, a variety of visual formatting may be applied.

Tag clouds may make use of different fonts, font sizes, structure/form/layout, coloring and so forth. Some tag clouds may even be displayed in a 3D fashion where some tags may appear to be farther away than others.

Sometimes it is useful to differentiate between private tag clouds and public tag clouds. Private tag clouds may be useful for a single user of a computer system because it is his notation and his area of interest. However, in social networks, public tag clouds may be useful. The access frequency and the relevancy may then be associated to a collective access frequency of a group of users. Thus, resources or information that may be more relevant to a larger subgroup of the main group may be made more easily accessible.

Federating tags across multiple systems is a relatively new concept. One interesting issue regarding federating tags is how to visualize tags retrieved from different systems properly to the end user.

Thus, there may be a need for an improved method for an interactive visualization of a tag cloud overcoming limitations of typical two-dimensional tag cloud representations.

This need may be addressed by a method for interactive visualization of tags via an interactive graphical user interface, a graphical interaction system, a computer system, a data processing program, and a computer program product according to the appended claims.

The aspects defined above and further aspects of the present subject matter are apparent from the examples of embodiment to be described hereinafter and are explained with reference to the examples of embodiment, but to which the present subject matter is not limited.

In the following, a detailed description of the drawings is provided. All illustrations in the drawings are schematic. First, a block diagram of the inventive method for interactive visualization of tags will be described. Afterwards, embodiments of the method and appearances of embodiments of the present subject matter for interactive visualization of tags via an interactive graphical user interface will be described.

FIG. 1 shows a block diagram of an example of an implementation of a method 100 for interactive visualization of tags. The method 100 for displaying tags via an interactive graphical user interface may include providing, 102, a current computer system with a current storage, providing, 104, a second computer system with a second storage, displaying, 106, on the interactive graphical user interface a sphere with a central circular disk, representing the current computer system, and a second circular disk as part of the sphere, representing the second computer system, positioned parallel above or below the central circular disk, displaying, 108, a current tag, representing a resource stored in the current storage, on the interactive graphical user interface, where the current tag is displayed on the surface of the central circular disk, displaying, 110, a second tag, representing a resource stored in the second storage, on the interactive graphical user interface, where the second tag is displayed on the surface of the second circular disk.

Figure 2:
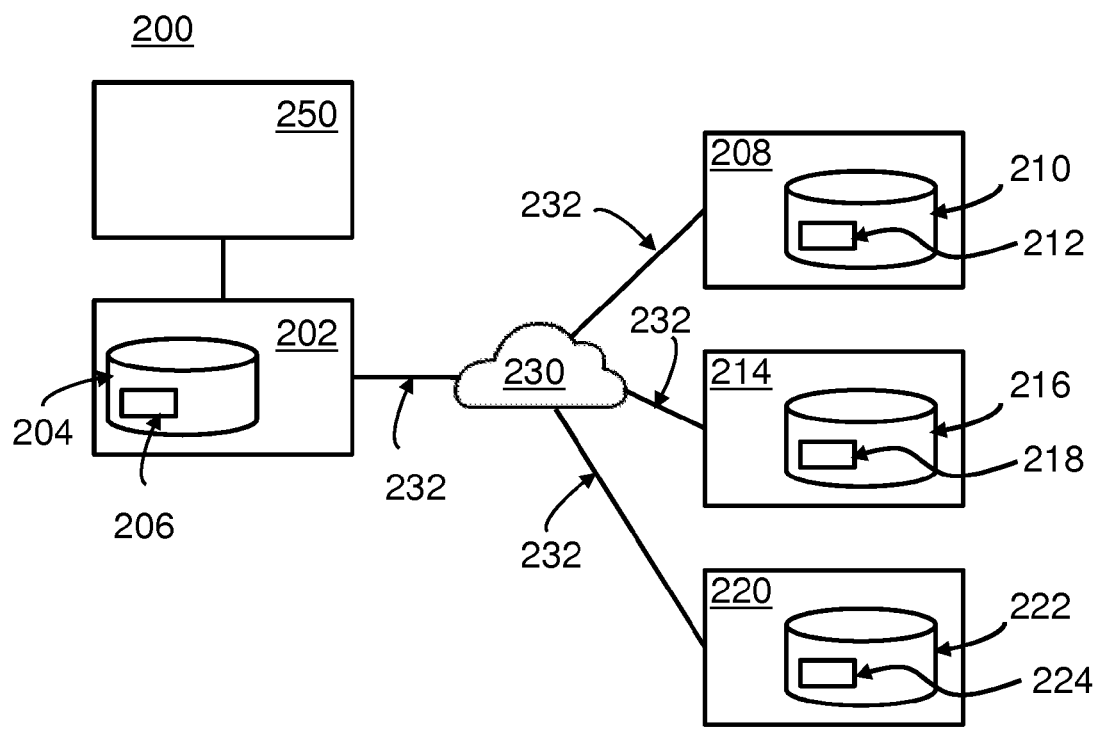
FIG. 2 shows a block diagram of computer systems in a network with related storage.

FIG. 2 is a block diagram of an example of an implementation of a system 200 that includes a network of computer systems 202, 208, 214, 220. The computer systems 208, 214 and 220 may also be network-attached or other storage systems. Each of these systems may have storage 204, 210, 216 and 222, respectively, with stored information resources 206, 212, 218 and 224, respectively. The computer systems 202, 208, 214 and 220 may each be connected via a link 232 to a network 230. Additionally, an interactive graphical user interface 250 may be coupled to or be a part of the computer system 202. The information resources 206, 212, 218 and 224 may be information items or resources accessible over the Internet by World Wide Web mechanisms or via a private network. Instead of relatively complex Internet addresses, the resources may have associated tags. A user may identify the resources by the tags. The computer system 202 may be named a current computer system into which that user is logged-in.

Figure 3:
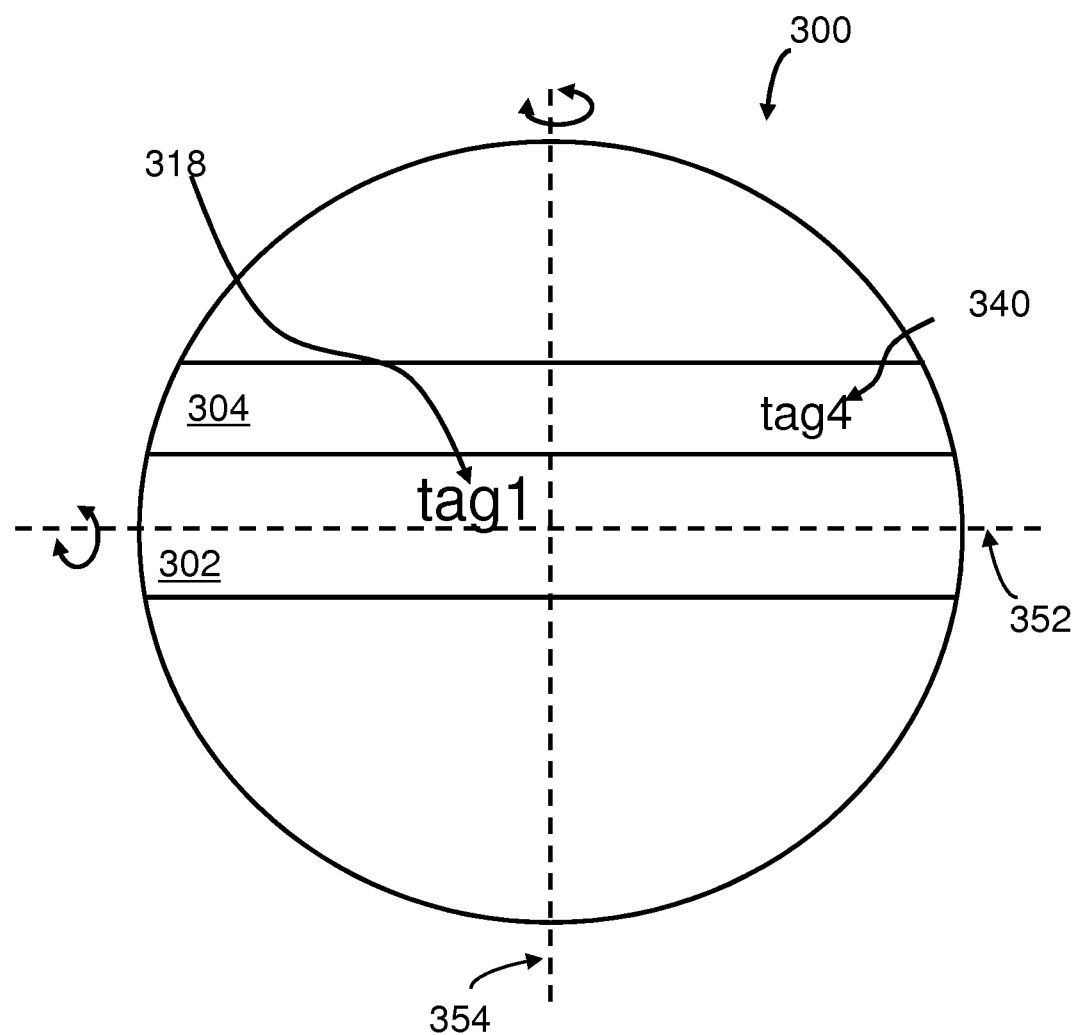
FIG. 3 shows a sphere with two circular disks.

FIG. 3 shows a diagram of an example of an implementation of a sphere 300 with two circular disks 302 and 304. Also shown is a tag 318 on the surface of the central circular disk 302 and another tag 340 on the circular disk 304. The sphere may be recognizable as a sphere by shading or other graphical effects. A horizontal axis 352, running from a left side to a right side of a visualization system, and more precisely centrally, horizontally through the middle of the sphere 300, may represent an x-axis. A second axis 354 may represent a y-axis, running vertically, centrally through the middle of the sphere 300. In that context, within FIG. 2 the computer system 202 may be represented by a central circular disk 302, and another computer system, for example, the computer system 208, may be represented by the circular disk 304.

Figure 4:
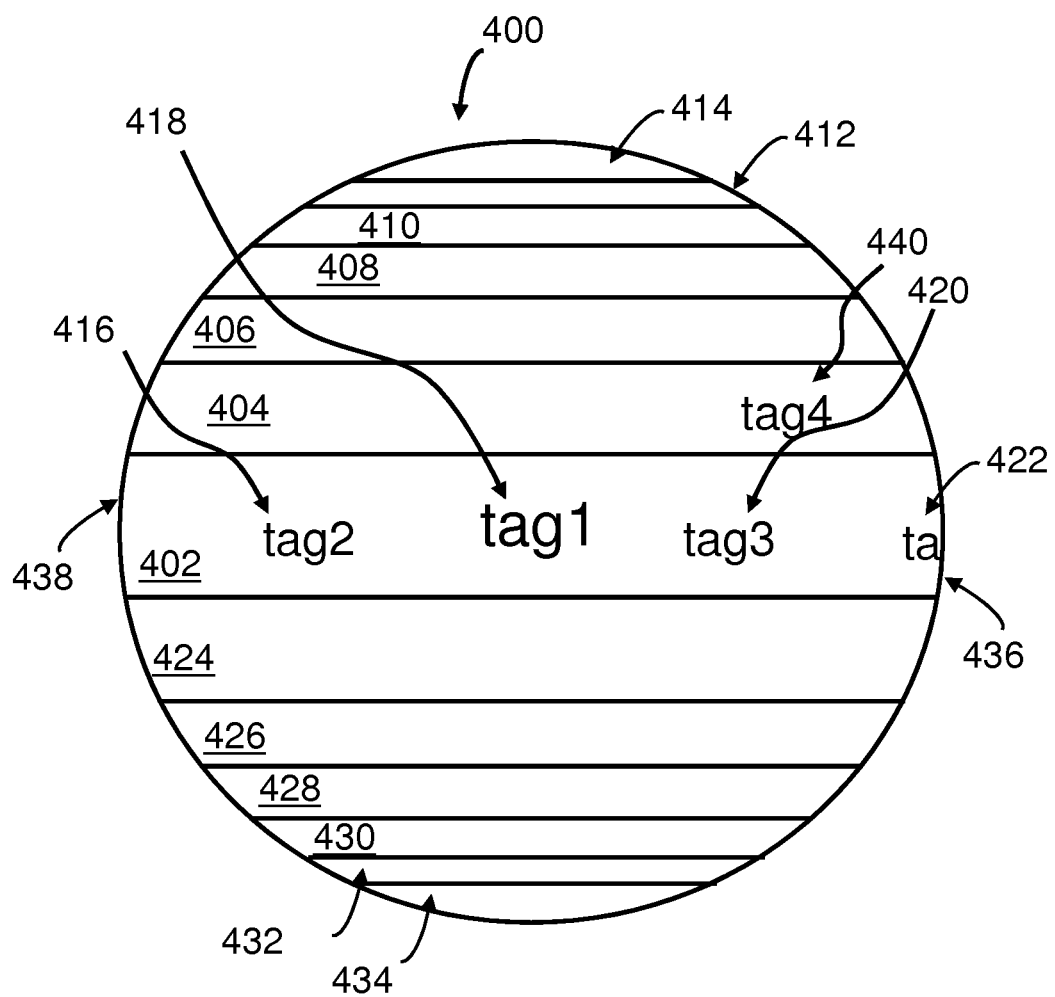
FIG. 4 shows a sphere with a plurality of circular disks.

FIG. 4 shows a diagram of an example of an implementation of a sphere 400 with a plurality of circular disks. The central circular disk 402 with tags 416, 418 and 420 may represent a current computer system 202. In this case, resources associated with tag1, tag2 and tag3 (i.e., the tags 418, 416, and 420, respectively) stored on storage 204 may be displayed on the surface of the central circular disk 402. Additionally, a tag 440 represents a resource on a second computer system represented by a circular disk 404. By turning the sphere 400 around a vertical, central axis, running from pole to pole of the sphere, other portions of the central circular disk 402 may become visible such that additional tags 422 may become visible. By turning or rotating around the named axis, a complete circumference of the sphere 400 may become visible—and with it additional tags representing additional resources stored on the current storage 204.

Other circular disks 404, 406, 408, 410 and 412, as well as circular disks 424, 426, 428, 430, and 432, may represent other computer or storage systems that may have stored resources accessible via tags. The above explained rotating effect would also apply to these circular disks. The circular disk may be rotated individually or as part of the complete sphere. The poles 414 and 434 may also represent a plurality of additional circular disks. However, because the height of the circular disks may decrease with a distance from an equator of the sphere 400, the additional circular disks may be less and less recognizable.

The sphere 400 may be quasi-rotated around an axis 352 (see context of FIG. 3, where the axis 352 is perpendicular to the axis 354) and the central circular disk 402 may be moved downwards, taking for example the original position of circular disk 424. The height of the circular disk 402 may then be decreased. Instead of the circular disk 402, circular disk 404 may now take the predominant position that was originally occupied by the circular disk 402. However, it should be noted that not any real physical rotation around an x-axis is described, since an orientation of the circular disks, even if moved up or downwards, stays the same. For example, a normal vector on a sliced surface may always run parallel to an axis running from pole to pole, meaning from North to South or from top to bottom of the sphere. In this sense, the movement of circular disks may be recognized by a user as a rotation; however, a real circular disk may behave differently, in that the normal vector of each sliced surface of each circular disk may change its direction by rotation around an x-axis.

Tags on other circular disks, such as the circular disk 404, may represent resources on other computer systems. The closer a circular disk may be to the circular disk 402, the closer the represented computer system may be to the current computer system, represented by the circular disk 402. The distance between the different computer systems represented by different circular disks may be defined by a distance function. For example, a second computer system may be defined as having a low distance to computer system 202 represented by circular disk 402, where an access frequency to tags being stored by this second computer system may be high compared to tags stored on other computer systems having stored resources that are represented by keywords of an associated tag cloud.

The importance or unimportance of different tags may be font and/or color-coded. Tags that may be accessed on one computer system more often may be displayed with a larger font. However, the font size may also be adjusted to a position of a circular disk on the sphere 400. This means that tags displayed on circular disks that may be displayed as further away from an equator of the sphere 400 may have smaller font sizes.

The distance function may be defined in physical or in logical terms. An example of a physical definition may be that the current computer may be a client computer system actually used by a user, whereas the next closest computer system may be a department computer system of an enterprise system. Next distances may be defined by computer systems located on the same campus as the current computer system, in the same city, in the same county, in the same country, in the same geographic region, and so on. The distance function may also be influenced by legal relationships between enterprise systems running the different computer systems that are represented by the different circular disks.

The turning, rotation, or quasi-rotation of the sphere 400 may be initiated by a pointing device (not shown) or a keyboard function. Hovering the pointing device over an outer rim 436 or 438 of the sphere 400 may rotate the sphere 400 in the respective direction. It may also be possible to click on individual tags such that the associated resources may be accessed. Hovering over individual circular disks may only rotate a single circular disk depending on a predefined configuration.

It may also be possible to rearrange the order of circular disks visible on the sphere 400. For example, a right click on a circular disk 408 and a movement of a pointer of a pointing device may reposition circular disk 408 on top of circular disk 402. A user may want to rearrange circular disks in this way because he/she may expect to access resources on the computer system represented by circular disk 408 more often in the future. If a circular disk is displayed closer to a central circular disk, a visible height of the respective circular disk may be larger so that more tags, or tags with a larger font size, may be displayed. This enables an easier access to resources represented by tags on remote computer systems represented by the respective circular disks.

Figure 5:
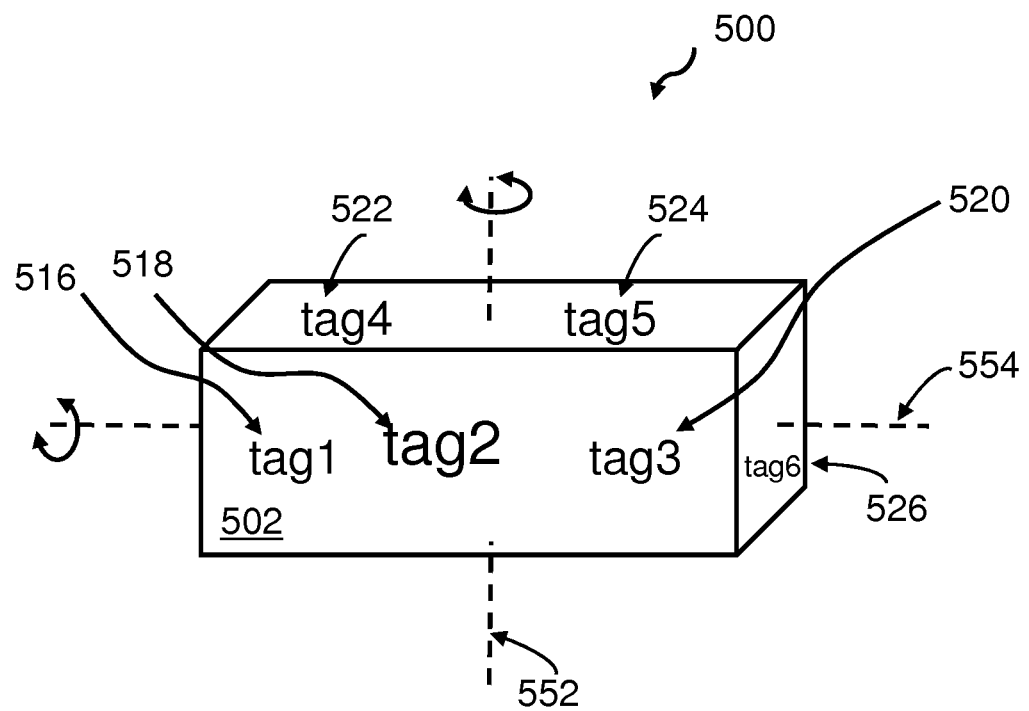
FIG. 5 shows a cuboid as an alternative to a sphere.

FIG. 5 shows an example of an implementation of a cuboid 500 instead of a sphere. In the case of the cuboid 500, only a dedicated number of surfaces may be available for displaying tags. For example, a surface 502 may represent a current computer system having stored resources represented by tags 516, 518 and 520. The surface showing tags 522 and 524 may represent another computer system that may also store resources accessible by a current user but that are stored on another, more remote computer system. Also, the lower side of the cuboid 500 (not shown) may represent another computer system. On the three just-described surfaces (e.g., front, top, and bottom) of the cuboid 500, tags from a public tag cloud, for example, may be represented. However, there may also be cause for only displaying tags of a private tag cloud. This may be done on a surface that currently shows tag 526, for example. This way, tags of a public tag cloud and a private tag cloud may be shown on a cuboid, such as the cuboid 500. The axis 552 and the axis 554 show that the cuboid 500 may be rotated around these axes in a comparable way as explained in the context of the sphere 300 and the sphere 400 described above. The sides used for displaying the private and public tag clouds may be permutated.

However, it should be noted that a sphere may also be arranged to show tags of a private tag cloud and a public tag cloud on the same sphere. For example, an upper half of the sphere may be reserved for tags of a public tag cloud, while a lower half of the sphere may be reserved for tags of a private tag cloud of a user.

Figure 6:
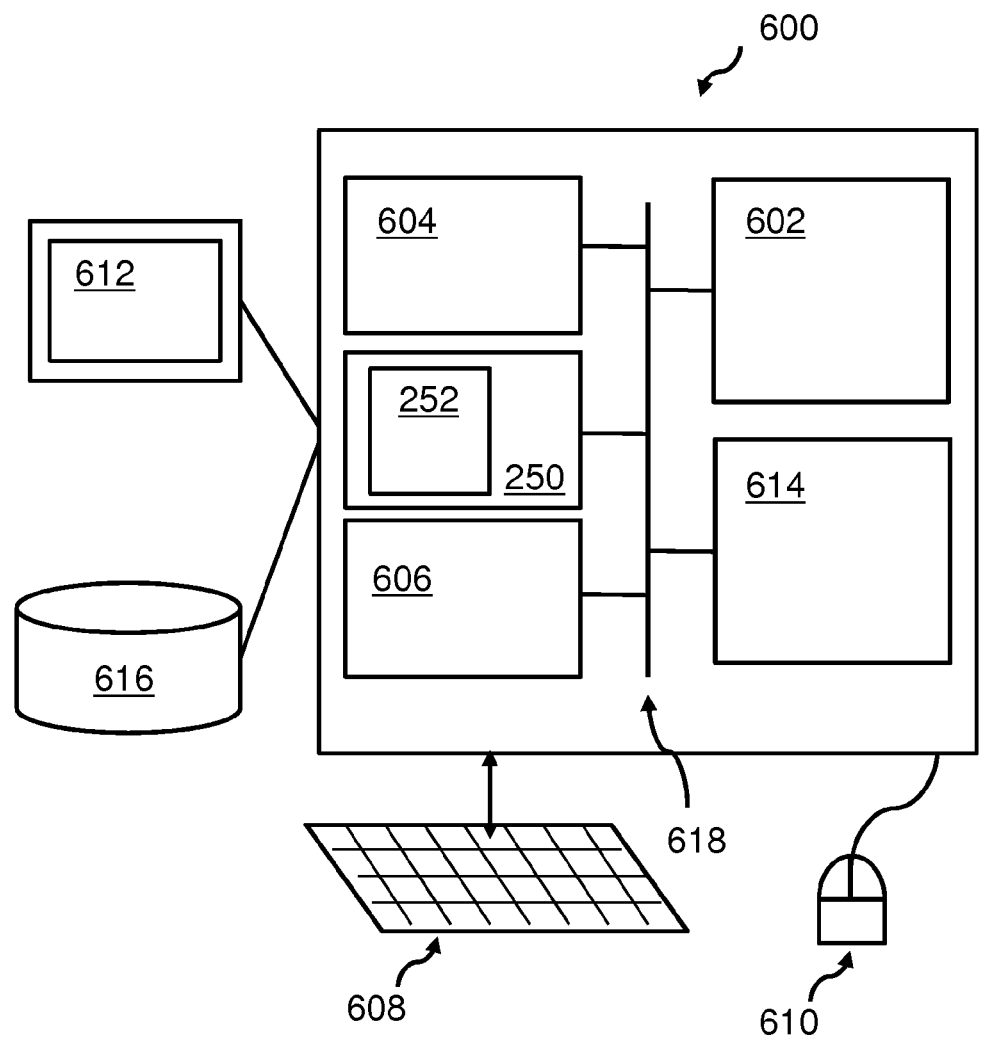
FIG. 6 shows a block diagram of a computer system that comprises the inventive graphical interaction system.

Embodiments of the present subject matter may be implemented on virtually any type of computer, regardless of the platform being used, suitable for storing and/or executing program code. FIG. 6 shows an example of an implementation of a computer system 600 that may include one or more processor(s) 602 with one or more cores per processor, associated memory elements 604, an internal storage device 606 (e.g., a hard disk, an optical drive such as a compact disk drive or digital video disk (DVD) drive, a flash memory stick, etc.), and numerous other elements and functionalities typical of computing devices (not shown). The memory elements 604 may include a main memory, employed during actual execution of the program code, and a cache memory, which provides temporary storage of at least some program code or data in order to reduce the number of times code may be retrieved from external bulk storage 616 for execution. Elements inside the computer system 600 may be linked together by means of a bus system 618 with corresponding adapters.

The computer system 600 may also include input means, such as a keyboard 608, a mouse 610, or a microphone (not shown). Furthermore, the computer system 600, may include output means, such as a monitor 612 (e.g., a liquid crystal display (LCD), a plasma display, a light emitting diode display (LED), or cathode ray tube (CRT) monitor). The monitor 612 may be driven by the graphical interaction system 250, having a displaying unit 252. The graphical interaction system 250, the displaying unit 252, and the monitor 612 may be combined within one unit. The computer system 600 may be connected to a network (e.g., a local area network (LAN), a wide area network (WAN), such as the Internet, or any other similar type of network including wireless networks) via a network interface connection 614. This interconnection may allow coupling to other computer systems. Those, skilled in the art will appreciate that many different types of computer systems exist, and the aforementioned input and output means may take other forms. Generally speaking, the computer system 600 may include at least the minimal processing, input and/or output means, suitable to practice embodiments of the present subject matter.

Further, those, skilled in the art will appreciate that one or more elements of the aforementioned computer system 600 may be located at a remote location and connected to the other elements over a network. Further, embodiments of the present subject matter may be implemented on a distributed system having a plurality of nodes, where each portion of the present subject matter may be located on a different node within the distributed system. In one embodiment of the present subject matter, the node corresponds to a computer system. Alternatively, the node may correspond to a processor with associated physical memory. The node may alternatively correspond to a processor with shared memory and/or resources or a smartphone.

In the present description for interactive visualization the term "tags" may, in particular, be used as a category term. Thus, also a single tag may be visualized. Additionally, the present subject matter is not limited to two circular disks. More than two disks may be displayed as part of the sphere representing more than two computer systems. It may also be possible that different parts of one and the same computer may be represented by the circular disks. It may also be possible that logical systems, like virtual machines, may be represented by the circular disks. Thus, there is no limitation regarding the scope of the present description in the sense that there is not a requirement for a one-to-one relationship between a physical computer system and a circular disk.

It may also be possible to use the present subject matter for interactive visualization as a user interface for a smartphone making displaying of a classical hierarchical file system obsolete and replacing it by visualization as described above. The described tags may, in particular, represent resources like text files, picture files, graphic files of any kind, music files, video files on a computer system, a smartphone, or other portable or stationary computer or storage systems. The tags may be generated manually or by auto-tagging methods, such as by using a name of a resource, a title in the resource (e.g., a title of a text document), or tags generated by a semantic analysis of the resource.

The tags displayed on the sphere may be clickable, directing a user to the resource and displaying the resource in response to detection of a click.

The present subject matter may, in particular, include a computer system used by a user or a computer system to which a user may be logged-in to (e.g. an electronic content management system). Thus, the physical system in front of the user may also include a thin client or a mobile device.

More specifically, the sphere displayed on the graphical user interaction system may use different colors or shading for different circular disks and the complete sphere or just single circular disks may be shaded.

In the context of this application, the following expression conventions have been followed:

Tag, tags—The term tag may denote a resource stored in a computer. The storage used may be any device that may store information. A tag typically represents a hyperlink in the World Wide Web concept. Thus, cloud tags may exist representing an area of interest of an individual (e.g., a private tag cloud). Or, on the other hand, a tag cloud may have been generated by a user community such that the tag cloud may represent a joint pool of keywords interesting for a group of users (e.g., a public tag cloud). The different tags may represent different resources on different computers or storage systems (e.g., network attached storage or virtual machines).

Sphere—A sphere may denote a three-dimensional body also known as ball, globe or simply spherical body. It may be rotational symmetrical around any of its axes. However, it should be noted that an elliptical body may fall under the term sphere.

Circular disk—The term circular disk may denote a disk that may be generated by slicing the sphere horizontally to a vertical axis of symmetry of the sphere. The circular disks may become smaller in their respective height the more they are positioned to an upper or lower pole of the sphere. Logically, the poles may be singularities, meaning that the closer a sphere is positioned to the pole, the more its height approaches a zero height.

Resource, resources—The term resource may denote any information resource stored in nodes of a computer network (e.g., computer systems, storage systems, network devices, etc.). The resources may have the form of stored text files, picture files, graphic files of any kind, music files, video files on a computer system, a smartphone, or other portable or stationary computer or systems arranged to store information.

Quasi-rotating may denote a movement of displayed elements such that a user may have the illusion of a real rotation. But instead, the elements may be moved on a surface of a sphere. Real world geometry rules may not apply. This is especially true for a quasi-rotation in which the impression/perception is generated that the sphere is rotated around an x-axis running horizontally through a display system, while the circular disks may keep their orientation in terms of a normal vector of a circular disk of a sliced sphere. Thus, a circular disk may just be moved up or down with respect to a vertical axis without losing its alignment of the normal vector, and may represent a y-axis.

The above-described subject matter for interactive visualization of a user interest model via an interactive graphical user interface and the associated graphical interaction system may offer some advantages. One of the advantages may be in overcoming the limitations of a two-dimensional representation of cloud tags just using color and font size in order to differentiate a different relevance of single tags to a user.

A spherical representation of interrelated storage resources, such as computers and storage systems in a network as well as information resources stored on the storage resources, may allow a user a much better navigation though ever growing tag clouds as well as a better management of information distributed over storage resources as well as an access optimization.

In one example implementation, the present subject matter may include rotating the sphere around a first axis running through the rotational symmetry axis of the central circular disk, and displaying on the interactive graphical user interface one or more tags, representing resources stored in the current storage on the surface of the central circular disk, the one or more tags becoming visible by rotation of the sphere around the first axis.

In particular, the rotation may be achieved by special key strokes on a computer keyboard or by using a pointing device. For example, a pointer of a pointing device like a computer mouse may be positioned on the left or right side of a rim of the sphere, thus, rotating the sphere in a left or right turn direction, respectively. The speed of rotation may also be adjustable.

In another example implementation, the present subject matter may include quasi-rotating the sphere around a second axis, running vertically to the first axis and centrally through the sphere, and by the quasi-rotation moving the central circular disk and the second circular disk up or down on the sphere, thereby keeping the central circular disk and the second circular disk horizontally aligned and normal to the first axis.

This way, a surface of a circular disk may not leave a visible zone. The visible surface of a circular disk may just be moved up or down in a direction of a pole of the sphere. As such, the circular disk's height may be decreased. This may, in particular, result in a decrease of a font size of the displayed tags on the surface of the circular disk. Below a certain threshold, the tags may not be displayed any longer. And the more a circular disk may be moved to a pole of the sphere it may visually no longer be differentiated with respect to neighboring circular disks. It may be said that each pole (i.e., north and south poles) of the sphere may represent a mathematical singularity in that no circular disk may be moved over the pole. The axis of rotational symmetry always stays parallel to an imaginary y-axis running from top to bottom of a display.

In particular, the central circular disk is moved up and down on the visible part of the sphere. Circular disks below or above the central circular disk may be moved accordingly to the central circular disk.

In yet another example implementation, the present subject matter may include displaying on the interactive graphical user interface a third circular disk, representing a third computer system having a third storage, displaying a third tag, representing a resource stored in the third storage, on the interactive graphical user interface, where the third tag is displayed on the surface of the third circular disk. The present subject matter may further include displaying on the interactive graphical user interface a fourth circular disk, representing a fourth computer system having a fourth storage, and displaying a fourth tag, representing a resource stored in the fourth storage, on the interactive graphical user interface, where the fourth tag is displayed on the surface of the fourth circular disk.

All circular disks may be arranged in parallel to each other and their normal vector on their flat surfaces may all be in parallel. However, the up and down movement creates the illusion/perception of a "sort of rotational movement" or quasi-rotation.

Other shapes, instead of a sphere, may also be used. For example, a cuboid may be used instead of the sphere. In this case, a front view may be used to display tags representing a current computer system and a public tag cloud. In contrast to this, a right side of the cuboid may be used to display tags of a private tag cloud.

In a further example implementation, the circular disks may decrease in height when moved, in particular, away from an equator of the sphere, towards of a top or a bottom of the sphere by the quasi-rotation around the second axis. However, as described above, the circular disks may stay, in particular, in parallel to each other and vertically to the y-axis. In particular, the height of the circular disks may decrease as a function of the distance from an equator of the sphere and reaching theoretical zero at a pole of the sphere.

The present subject matter may include a distance of one of the second, third, and fourth circular disk to the central circular disk based on a predefined distance function.

In particular, the distance may be defined as a physical distance between locations of computer systems or it may also be function of a logical distance.

In one example implementation, the predefined distance function may be a function of an access frequency of tags representing resources being stored on the second, third, and fourth computer system. Thus, a logical distance may, in particular, be linked to a frequency of access of individual resources represented by tags. If a tag on one computer system or storage may be used for most of all tags in a tag cloud, then there may be a small logical distance between the current computer system and the relevant computer system. In this case, the relevant computer system may be represented as a circular disk closest on top or below the circular disk representing the current system.

The less an access frequency to resources of another computer is, the greater the distance to the circular disk representing the current computer system may be. It may also be possible to combine access frequencies of tags of resources on either the second, or the third or the fourth computer. Thus, the circular disk representing the computer with the highest combined access frequency to resources being represented by tags may be displayed closest to the circular disk representing the current computer.

In again another example implementation, the distance function may also include a function of a frequency of a circular disk being displayed on or in the neighborhood of an equator of the sphere.

The neighborhood may, in particular, refer to an area close to the equator of the sphere. This may mean at a second or third position away from the equator. This is because resources that are of interest to a user may be quasi-rotated to an equator zone more often.

In another example implementation, the present subject matter may include rearranging the distance of the second, third or fourth circular disk based on an input variable received from a user. In particular, this may be achieved by a pointing device. For example, a right click on a circular disk may fix the circular disk to the pointer of the pointing device and may be moved up or down on the sphere, thus, bringing it closer to the circular disk representing the current system.

Further, a computer system may include a graphical interaction system, as just described and referring to the present subject matter for interactive visualization of tags via an interactive graphical user interface.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be noted that the term "comprising" does not exclude other elements or steps and "a" or "an" does not exclude a plurality. Also, elements described in association with different embodiments may be combined. It should also be noted that reference signs in the claims should not be construed as limiting elements.

What is claimed is:

1. A computer-implemented method of interactive visualization of federated tags via an interactive graphical user interface, comprising:
    displaying on the interactive graphical user interface a sphere with a central circular disk that represents a current computer system of a plurality of federated computing systems, and a second circular disk that represents a second federated computer system of the plurality of federated computing systems as part of the sphere positioned parallel above or below the central circular disk;
    displaying a current tag comprising a hyperlink to and representing content of a first resource stored in a current storage of the current computer system on the interactive graphical user interface, where the current tag is displayed on a surface of the central circular disk;
    displaying a second tag retrieved from the second federated computer system, and comprising a hyperlink to and representing content of a second resource stored in a second storage of the second federated computer system on the interactive graphical user interface, where the second tag is displayed on a surface of the second circular disk;
    rotating the sphere, in response to a detected user input, around a first axis running through a rotational symmetry axis of the central circular disk; and
    displaying on the interactive graphical user interface on the surface of the central circular disk one or more additional tags, each comprising a hyperlink to and representing content of an additional resource stored in the current storage, the one or more additional tags becoming visible by the rotation of the sphere around the first axis.

2. The computer-implemented method according to claim 1, further comprising:
    quasi-rotating the sphere, in response to the detected user input, around a second axis running perpendicular to the first axis and centrally through the sphere; and
    where the quasi-rotation moves the central circular disk and the second circular disk up or down on the sphere, and the central circular disk and the second circular disk horizontally remain aligned and normal relative to the first axis.

3. The computer-implemented method according to claim 2, where the central circular disk and the second circular disk decrease in height in response to being moved away from an equator of the sphere and towards a top or a bottom of the sphere by the quasi-rotation around the second axis.

4. The computer-implemented method according to claim 1, further comprising:
    displaying on the interactive graphical user interface a third circular disk representing a third federated computer system of the plurality of federated computing systems;
    displaying a third tag comprising a hyperlink to and representing content of a third resource stored in a third storage of the third federated computer system on the interactive graphical user interface, where the third tag is displayed on a surface of the third circular disk;
    displaying on the interactive graphical user interface a fourth circular disk representing a fourth federated computer system of the plurality of federated computing systems; and
    displaying a fourth tag comprising a hyperlink to and representing content of a fourth resource stored in a fourth storage of the fourth federated computer system on the interactive graphical user interface, where the fourth tag is displayed on a surface of the fourth circular disk.

5. The computer-implemented method according claim 4, where a distance of one of the second, third, and fourth circular disk to the central circular disk is based on a predefined distance function.

6. The computer-implemented method according to claim 5, where the predefined distance function comprises a function of an access frequency of the respective tags representing the resources stored on the respective second, third, and fourth federated computer systems.

7. The computer-implemented method according to claim 5, where the predefined distance function comprises a function of a display frequency of each circular disk displayed relative to an equator of the sphere.

8. The computer-implemented method according to claim 5, further comprising rearranging one of the distance and an order of the one of the second, third and fourth circular disk in response to a detected input received from a user.

9. A system, comprising:
    a displaying unit; and
    a processor programmed to cause the displaying unit to:
        display on an interactive graphical user interface a sphere with a central circular disk that represents a current computer system of a plurality of federated computing systems, and display a second circular disk as part of the sphere that represents a second federated computer system of the plurality of federated computing systems, where the second circular disk is positioned parallel above or below the central circular disk;
        display a current tag comprising a hyperlink to and representing content of a first resource stored in a current storage of the current computer system on the interactive graphical user interface, where the current tag is displayed on a surface of the central circular disk;
        display a second tag retrieved from the second federated computer system, and comprising a hyperlink to and representing content of a second resource stored in a second storage of the second federated computer system on the interactive graphical user interface, where the second tag is displayed on a surface of the second circular disk;
        rotate the sphere, in response to a detected user input, around a first axis running through a rotational symmetry axis of the central circular disk; and
        display on the interactive graphical user interface on the surface of the central circular disk one or more additional tags, each comprising a hyperlink to and representing content of an additional resource stored in the current storage, the one or more additional tags becoming visible by the rotation of the sphere around the first axis.

10. The system according to claim 9, where the processor is further programmed to cause the displaying unit to:
    quasi-rotate the sphere, in response to the detected user input, around a second axis running perpendicular to the first axis and centrally through the sphere; and
    where the quasi-rotation moves the central circular disk and the second circular disk up or down on the sphere, and the central circular disk and the second circular disk horizontally remain aligned and normal relative to the first axis.

11. The system according to claim 10, where the processor is further programmed to cause the displaying unit to cause the central circular disk and the second circular disk to decrease in height in response to being moved away from an equator of the sphere and towards a top or a bottom of the sphere by the quasi-rotation around the second axis.

12. The system according to claim 9, where the processor is further programmed to cause the displaying unit to:
   display on the interactive graphical user interface a third circular disk representing a third federated computer system of the plurality of federated computing systems;
   display a third tag comprising a hyperlink to and representing content of a third resource stored in a third storage of the third federated computer system on the interactive graphical user interface, where the third tag is displayed on a surface of the third circular disk;
   display on the interactive graphical user interface a fourth circular disk representing a fourth federated computer system of the plurality of federated computing systems; and
   display a fourth tag comprising a hyperlink to and representing content of a fourth resource stored in a fourth storage of the fourth federated computer system on the interactive graphical user interface, where the fourth tag is displayed on a surface of the fourth circular disk.

13. The system according to claim 12, where a distance of one of the second, third, and fourth circular disk to the central circular disk is based on a predefined distance function.

14. The system according to claim 13, where the predefined distance function comprises a function of an access frequency of the respective tags representing the resources stored on the respective second, third, and fourth federated computer systems.

15. The system according to claim 13, where the processor is further programmed to cause the displaying unit to rearrange one of the distance and an order of the one of the second, third and fourth circular disk in response to a detected input received from a user.

16. A computer program product comprising a non-transitory computer readable storage medium including computer readable program code, where the computer readable program code when executed on a computer causes the computer to:
   display on an interactive graphical user interface a sphere with a central circular disk that represents a current computer system of a plurality of federated computing systems, and display a second circular disk as part of the sphere that represents a second federated computer system of the plurality of federated computing systems, where the second circular disk is positioned parallel above or below the central circular disk;
   display a current tag comprising a hyperlink to and representing content of a first resource stored in a current storage of the current computer system on the interactive graphical user interface, where the current tag is displayed on a surface of the central circular disk;
   display a second tag retrieved from the second federated computer system, and comprising a hyperlink to and representing content of a second resource stored in a second storage of the second federated computer system on the interactive graphical user interface, where the second tag is displayed on a surface of the second circular disk;
   rotate the sphere, in response to a detected user input, around a first axis running through a rotational symmetry axis of the central circular disk; and
   display on the interactive graphical user interface on the surface of the central circular disk one or more additional tags, each comprising a hyperlink to and representing content of an additional resource stored in the current storage, the one or more additional tags becoming visible by the rotation of the sphere around the first axis.

17. The computer program product of claim 16, where the computer readable program code when executed on the computer further causes the computer to:
   quasi-rotate the sphere, in response to the detected user input, around a second axis running perpendicular to the first axis and centrally through the sphere; and
   where the quasi-rotation moves the central circular disk and the second circular disk up or down on the sphere, and the central circular disk and the second circular disk horizontally remain aligned and normal relative to the first axis.

18. The computer program product of claim 17, where the computer readable program code when executed on the computer further causes the computer to cause the central circular disk and the second circular disk to decrease in height in response to being moved away from an equator of the sphere and towards a top or a bottom of the sphere by the quasi-rotation around the second axis.

19. The computer program product of claim 18, where the computer readable program code when executed on the computer further causes the computer to:
   display on the interactive graphical user interface a third circular disk representing a third federated computer system of the plurality of federated computing systems;
   display a third tag comprising a hyperlink to and representing content of a third resource stored in a third storage of the third federated computer system on the interactive graphical user interface, where the third tag is displayed on a surface of the third circular disk;
   display on the interactive graphical user interface a fourth circular disk representing a fourth federated computer system of the plurality of federated computing systems; and
   display a fourth tag comprising a hyperlink to and representing content of a fourth resource stored in a fourth storage of the fourth federated computer system on the interactive graphical user interface, where the fourth tag is displayed on a surface of the fourth circular disk.

20. The computer program product of claim 19, where a distance of one of the second, third, and fourth circular disk to the central circular disk is based on a predefined distance function.

21. The computer program product of claim 20, where the predefined distance function comprises a function of an access frequency of the respective tags representing the resources stored on the respective second, third, and fourth federated computer systems.

22. The computer program product of claim 20, where the computer readable program code when executed on the computer further causes the computer to rearrange one of the distance and an order of the one of the second, third and fourth circular disk in response to a detected input received from a user.

* * * * *